Figure 1:
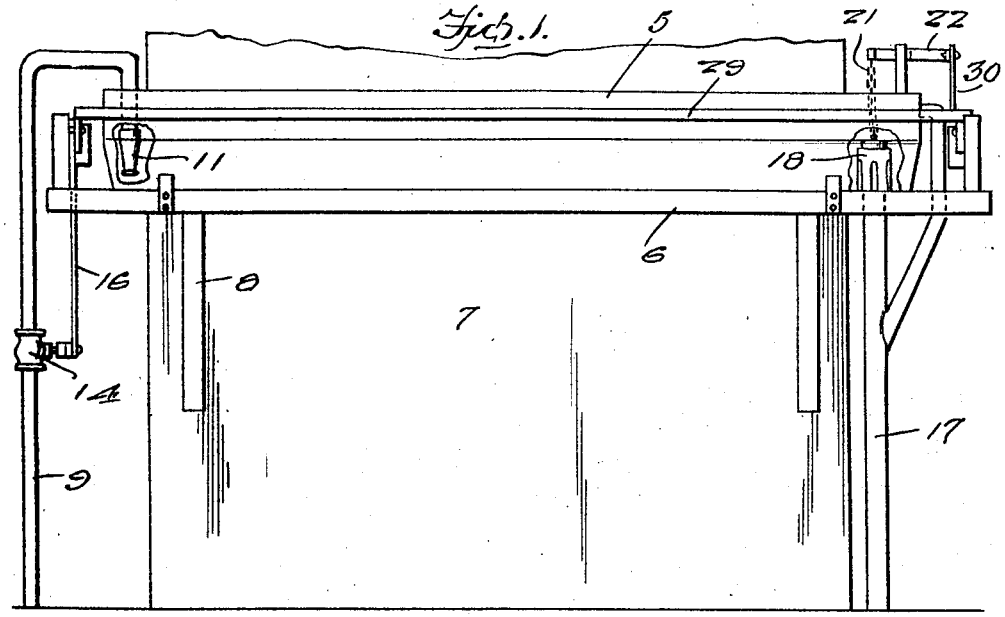

Dec. 1, 1925.

P. WIERDSMA

POULTRY DRINKING FOUNTAIN

Filed Sept. 9, 1925

1,563,414

2 Sheets-Sheet 1

Inventor
P. Wierdsma
By Clarence A. O'Brien
Attorney

Dec. 1, 1925.  1,563,414
P. WIERDSMA
POULTRY DRINKING FOUNTAIN
Filed Sept. 9, 1925  2 Sheets-Sheet 2
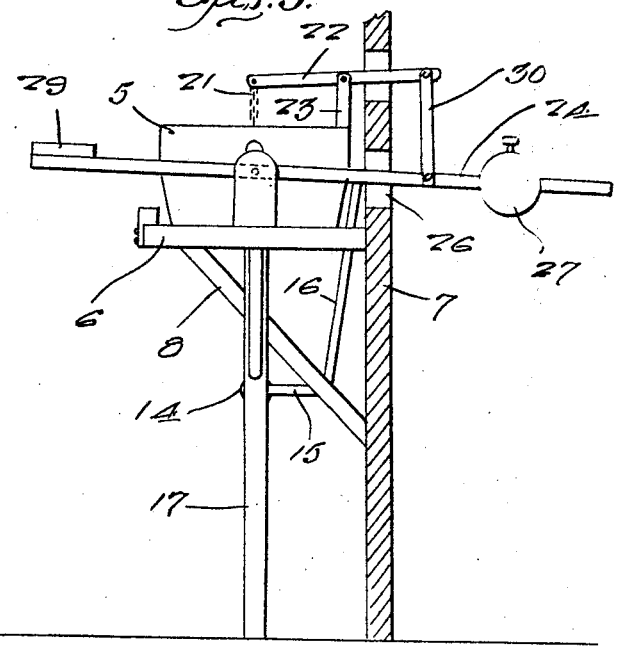
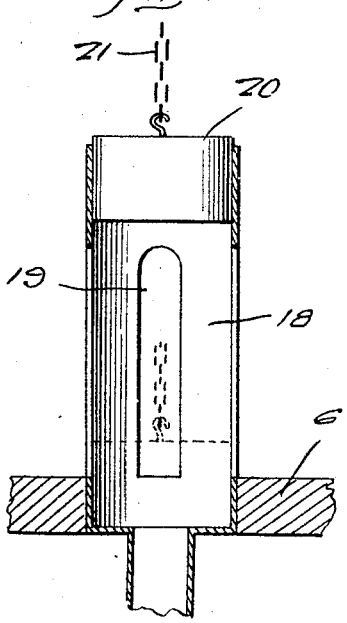
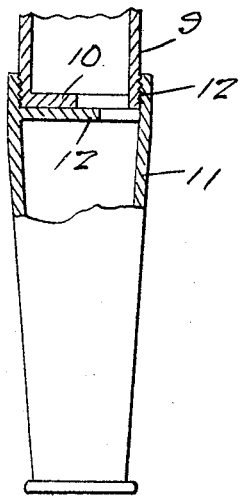
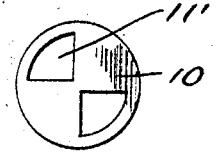
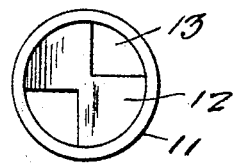
Inventor
P. Wierdsma
By Clarence A. O'Brien
Attorney Patented Dec. 1, 1925.

1,563,414

UNITED STATES PATENT OFFICE.

PAUL WIERDSMA, OF PETALUMA, CALIFORNIA.

POULTRY DRINKING FOUNTAIN.

Application filed September 9, 1925. Serial No. 55,279.

*To all whom it may concern:*

Be it known that PAUL WIERDSMA, a citizen of the United States, residing at Petaluma, in the county of Sonoma and State of California, has invented certain new and useful Improvements in Poultry Drinking Fountains, of which the following is a specification.

The present invention relates to a poultry drinking fountain and has for its principal object to provide a structure wherein a perch is provided for the poultry when drinking, which will actuate a valve for supplying the trough with fresh water and when no poultry is on the perch said valve will be closed and means will be actuated for draining off what water may have collected in the trough.

Another important object of the invention is to provide a poultry drinking fountain of this nature which is exceedingly simple in its construction, highly sanitary, inexpensive to construct, strong, durable, not likely to easily become out of order, efficient and reliable in operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing,—

Figure 2:
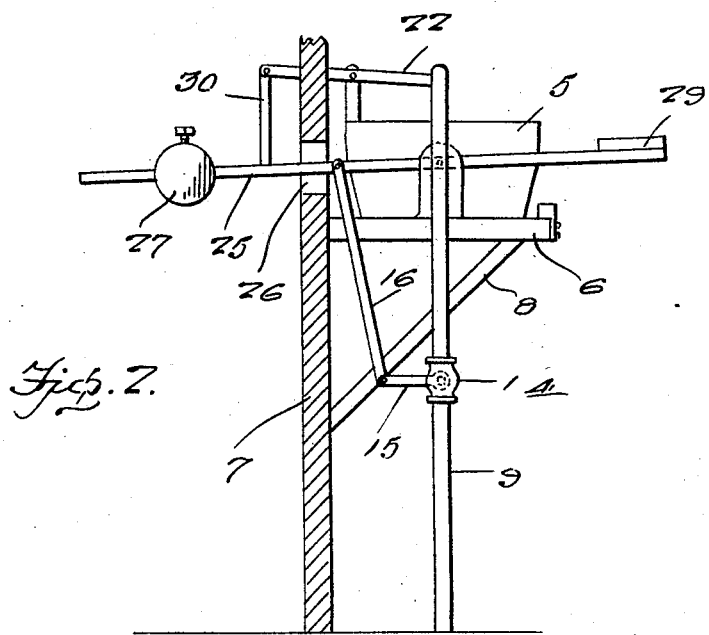

Figure 1 is a front elevation of the device embodying the features of my invention, Figure 2 is an end elevation thereof, Figure 3 is another end elevation thereof, Figure 4 is a detailed section through the outlet valve, Figure 5 is a sectional elevation of the inlet nozzle, Figure 6 is a plan view of the valve member in the outlet end of the supply pipe, and Figure 7 is an end elevation of the nozzle.

Referring to the drawings in detail, it will be seen that 5 denotes the drinking trough which may be of any desired shape or formation. In the present instance this trough 5 is mounted on a platform 6. The platform 6 is supported above the ground in any suitable manner such as being fixed to a wall 7 and braced as at 8. A supply pipe 9 leads from any suitable water supply and terminates within the trough 5 at one end thereof. A valve disc 10 is fixed in the outlet end of the pipe 9 and has openings 11' provided therein. A nozzle 11 is threaded as at 12 on the outlet end of the supply pipe 9 and has a valve disc 12 therein provided with openings 13 adapted to be placed in full or partial registry with openings 11'. A valve 14 is provided in the pipe 9 and has a control crank 15 associated therewith pivotally engaged with a link 16.

A drain pipe 17 extends through the platform 6 into the trough 5 and terminates in an enlarged cylindrical portion 18 having slots 19 therein. A valve piston 20 is slidable in this cylindrical portion 18 and is normally held at the upper end thereof by a chain 21 connected to a rocker arm 22 mounted on bracket 23 rising from the trough. A pair of levers 24 and 25 extend through openings 26 in the wall 7 and have weights 27 adjustably mounted thereon. A perch bar 29 is attached to the other ends of the levers 24 in front of the trough 5. A link 30 connects the lever 24 with the rocker arm 22. The link 16 is pivotally engaged with the lever 25.

Weights 27 normally hold the levers 24 and 25 so that the valve 14 is closed and the piston valve 20 is opened or at the top of the cylindrical portion 18 so that water which may have collected in the trough is free to drain through the pipe 17. When a chicken lights on the perch 29 the levers will be rocked so as to open the valve 14 and close the drain valve 20 and thus water will flow into the trough and the chicken may drink from fresh water. Of course, as soon as the chicken flies from the perch the valve 14 is shut off and the valve 20 is opened so that the excess water which has collected in the trough will be drained therefrom. With this construction clean water is fed to the poultry at all times thus preventing illness which is usually caused by drinking dirty water.

It is thought that the construction, operation, and advantages of this invention will now be clearly understood without a more detailed description thereof. It is apparent, however, that numerous changes in the details of construction, and in the combination and arrangement of parts, may be resorted to without departing from the spirit or scope of the invention as hereinafter claimed or sacrificing any of its advantages.

Having thus described my invention, what I claim as new is:—

1. In combination, a trough, a pair of levers pivotally mounted at the ends of the trough, a perch connecting corresponding ends of the levers, a drain associated with the trough, a valve associated with the drain, weights on the levers, means for operating the valve, said means being controlled by one of said levers so that said valve is normally held open, a water supply pipe leading into the trough, a valve associated with the water supply pipe, means for controlling said valve operable by the other lever to be normally closed.

2. In combination, a trough, a pair of levers pivotally mounted at the ends of the trough, a perch connecting corresponding ends of the levers, a drain associated with the trough, a valve associated with the drain, weights on the levers, means for operating the valve, said means being controlled by one of said levers so that said valve is normally held open, a water supply pipe leading into the trough, a valve associated with the water supply pipe, means for controlling said valve operable by the other lever to be normally closed, means for adjusting the weights on said levers.

3. In combination, a trough, a drain associated with the trough, a valve associated with the drain, a water supply pipe, a valve in the water supply pipe, a pair of levers one at each end of the trough, weights on the levers to hold them normally in a predetermined position, a perch connecting the other ends of the levers, a link rising from one lever, a rocker arm attached to the link, a chain connecting the rocker arm with the valve of the drain to normally hold it open and to allow the same to close when the perch is moved downwardly, a link extending downwardly from the other lever, a control for the valve of the supply pipe connected with the link so that when the perch is moved downwardly said valve of the supply pipe is opened.

In testimony whereof I affix my signature.

PAUL WIERDSMA.